United States Patent [19]
Schuda

[11] Patent Number: 5,961,203
[45] Date of Patent: Oct. 5, 1999

[54] SMALL LAMP AND POWER SUPPLY ASSEMBLY

[75] Inventor: Felix J. Schuda, Saratoga, Calif.

[73] Assignee: ILC Technology, Inc., Sunnyvale, Calif.

[21] Appl. No.: 08/949,607

[22] Filed: Oct. 14, 1997

[51] Int. Cl.[6] .................................................. F21V 29/00
[52] U.S. Cl. ......................... 362/294; 362/373; 362/264; 362/580; 362/581
[58] Field of Search ..................... 362/551, 580, 362/582, 294, 373, 263, 265, 264; 385/15, 31, 39, 136, 137, 134, 901, 115

[56] References Cited

U.S. PATENT DOCUMENTS

| | | | |
|---|---|---|---|
| 3,681,592 | 8/1972 | Hugelshofer | 362/552 |
| 3,775,606 | 11/1973 | Bazell et al. | 362/552 |
| 4,025,776 | 5/1977 | Cawood | 362/581 |
| 4,613,931 | 9/1986 | Massinger | 362/580 |
| 5,243,500 | 9/1993 | Stephenson et al. | 362/580 |
| 5,295,052 | 3/1994 | Chin et al. | 362/551 |
| 5,329,436 | 7/1994 | Chiu | 362/294 |
| 5,335,154 | 8/1994 | Koitabashi et al. | 362/294 |
| 5,617,302 | 4/1997 | Kloots | 362/581 |

FOREIGN PATENT DOCUMENTS

| | | | |
|---|---|---|---|
| 406118312 | 4/1994 | Japan | 362/581 |

Primary Examiner—Thomas M. Sember
Attorney, Agent, or Firm—Thomas E. Schatzel; Law Offices of Thomas E. Schatzel

[57] ABSTRACT

A light source comprises a high intensity lamp that is clamped between four half-shell finned heatsinks. The upper heatsink half-shells for the anode and cathode ends of the lamp are mounted to an upper printed circuit board and the lower heatsink half-shells are mounted to a lower main printed circuit board. A direct current powered fan is positioned on one side to blow horizontally through the matrix of heatsinks and out the opposite side. Only the lamp igniter and fan power supply circuits are included in the upper printed circuit board which receives lamp power from the lower printed circuit boards through the anode and cathode heatsinks and one additional connection comprising a flexible wire. The main power supply is included on the lower printed circuit board and it converts and preregulates 110 VAC or 220 VAC to 160 VDC to a transistor chopping switch that in turn provides the required low voltage lamp power. A cooling ring is mounted to the front of the lamp and includes a tilted hot mirror that reflects infrared light back to the lamp but off-axis five to ten degrees to improve lamp life. A fiberoptic cable adapter and backing ring are mounted and optically aligned in front of the lamp such that the fiberoptic cable adapter can be changed from the outside without affecting the optical pre-alignment. The whole is packaged in a housing that assists the fan in cooling the lamp by directing airflow through the heatsinks.

12 Claims, 7 Drawing Sheets

SMALL LAMP AND POWER SUPPLY ASSEMBLY

BACKGROUND OF THE INVENTION

1. Field of the Invention

The invention relates generally to high intensity lamps and more specifically to complete light sources with fiberoptic output drive capability such as light sources used in medical equipment.

2. Description of the Prior Art

Fiber optic light sources, e.g. CERMAX®-type lamps of ILC Technology, Inc. are high intensity sources for cool, white light. Light sources that incorporate CERMAX-type xenon lamps require no warm-up time and are approved by the medical community for safety. Standard industry designs from 75 W up to 300 W are used to illuminate multiple fibers.

A critical consideration in lamp life and arc stability is the maintenance of adequate cooling. In a few situations it may be possible to cool the lamp by convection, but in general, the flow of air must be adequate and therefore cannot be blocked. The critical temperatures are usually at the seals of the arc tube. If the temperature limits at these points are exceeded, the seals may fail.

Single board light-sources using CERMAX-type lamps have existed for some time. A single board light-source unit with the lamp and its power supply mounted on the same printed circuit (PC) board exists. Unfortunately, the whole unit was relatively large.

Other lamps intended to be the internal building block of a medical light-source or the "light engine" for a low power video projector or computer monitor, though smaller and lower cost than predecessors, the power supply could only operate from 110 VAC. Also, associated heatsinks were not optimized for extracting the large heat load from the lamp. Consequently, maximum lamp power was restricted.

SUMMARY OF THE PRESENT INVENTION

It is therefore an object of the present invention to provide a small and inexpensive light source.

It is an object of the present invention to provide a light source for a video projector.

It is another object of the present invention to provide a light source that can accommodate a variety of lamps without requiring other components to be changed also.

It is a further object of the present invention to provide a light source that can meet the applicable national and regional electromagnetic interference and safety standards that are required around the world by law.

Briefly, a light source embodiment of the present invention comprises a high intensity lamp that is clamped between four half-shell finned heatsinks. The upper heatsink half-shells for the anode and cathode ends of the lamp are mounted to an upper printed circuit board and the lower heatsink half-shells are mounted to a lower main printed circuit board. A direct current powered fan is positioned on one side to blow horizontally through the matrix of heatsinks and out the opposite side. Only the lamp igniter and fan power supply circuits are included in the upper printed circuit board which receives lamp power from the lower printed circuit boards through the anode and cathode heatsinks and one additional connection comprising a flexible wire. The main power supply is included on the lower printed circuit board and it converts and preregulates 110 VAC or 220 VAC to 110 to 160 VDC to a transistor chopping switch that provides the required low voltage lamp power. A cooling ring is mounted to the front of the lamp and includes a tilted hot mirror that reflects infrared light back to the lamp but off-axis five to ten degrees to improve lamp life. A fiberoptic cable adapter and backing ring are mounted and optically aligned in front of the lamp such that the fiberoptic cable adapter can be changed from the outside without affecting the optical pre-alignment. The whole is packaged in a housing that assists the fan in cooling the lamp by directing airflow through the heatsinks.

An advantage of the present invention is that a light source is provided that is relatively very small and compact.

Another advantage of the present invention is that a light source is provided that is economical to manufacture.

A further advantage of the present invention is that a light source is provided that accommodates a variety of lamp styles and sizes without requiring changes to other components.

Another advantage of the present invention is that a light source is provided that extends the life of the lamps it uses by reflecting infrared light from an output hot mirror off-axis back toward the lamp.

A still further advantage of the present invention is that a light source is provided that operates equally as well on 110 VAC and 220 VAC utilities.

Another advantage of the present invention is that a light source is provided that can have its fiberoptic cable adapter changed without requiring the user to go inside the unit to readjust the optical alignment for the new adapter.

These and other objects and advantages of the present invention will no doubt become obvious to those of ordinary skill in the art after having read the following detailed description of the preferred embodiment which is illustrated in the drawing figures.

DETAILED DESCRIPTION OF THE PREFERRED EMBODIMENTS

Figure 1:
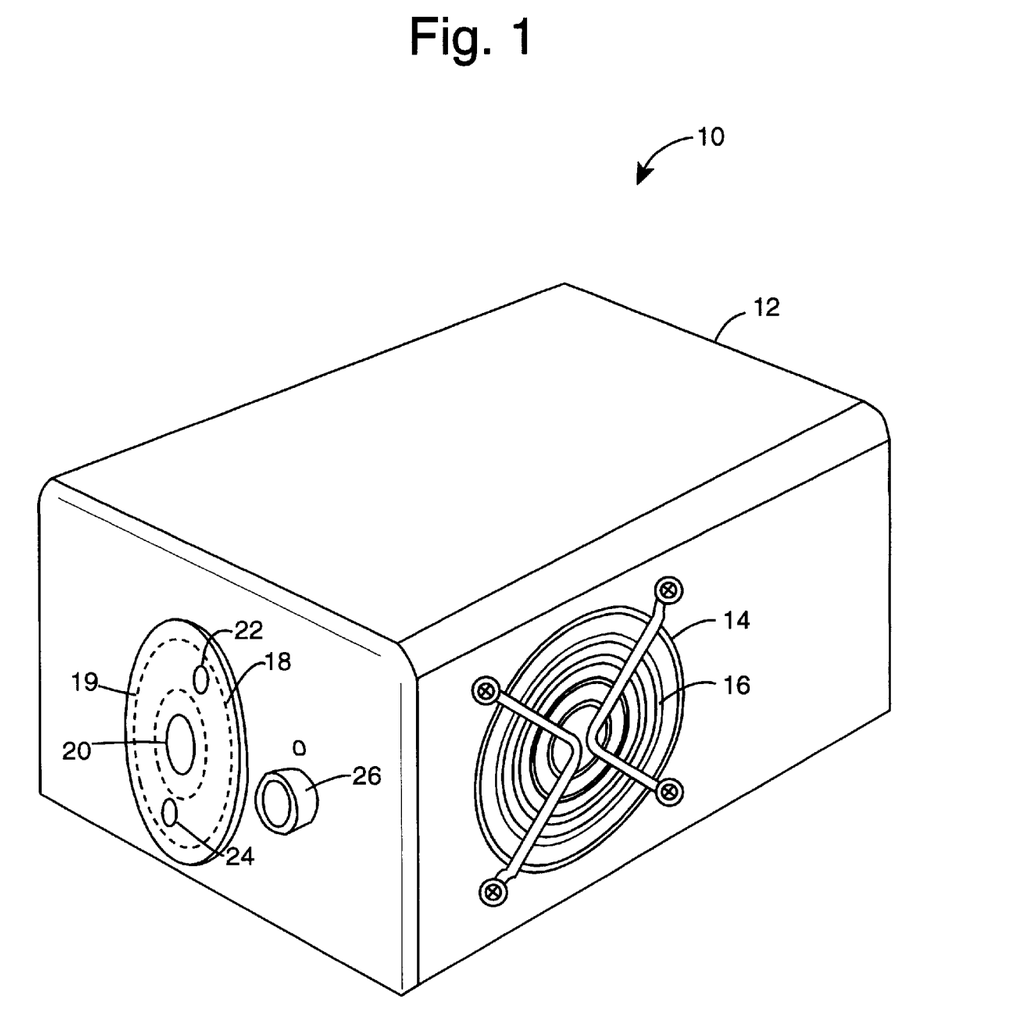
FIG. 1 is a three-dimensional perspective view of a light source embodiment of the present invention with the air intake visible on one side and the fiberoptic cable adapter and light output visible on the front.

FIG. 1 illustrates a light source embodiment of the present invention, referred to herein by the general reference numeral 10. A separable housing 12 has an air intake hole 14 covered by a fan grille 16. A fiberoptic adapter plate 18 is attached to a backing plate 19 which in turn is adjustably attached to the housing 12. The fiberoptic adapter plate 18 has a central opening 20 that receives a fiberoptic output cable. A pair of screws 22 and 24 hold the adapter plate 18 to the backing plate 19 and thus allow removal of the adapter plate 18 without having to disturb the optical alignment of the backing plate 19. A brightness control 26 allows for a user adjustment of the light output intensity input to the fiberoptic output cable.

Figure 2A:
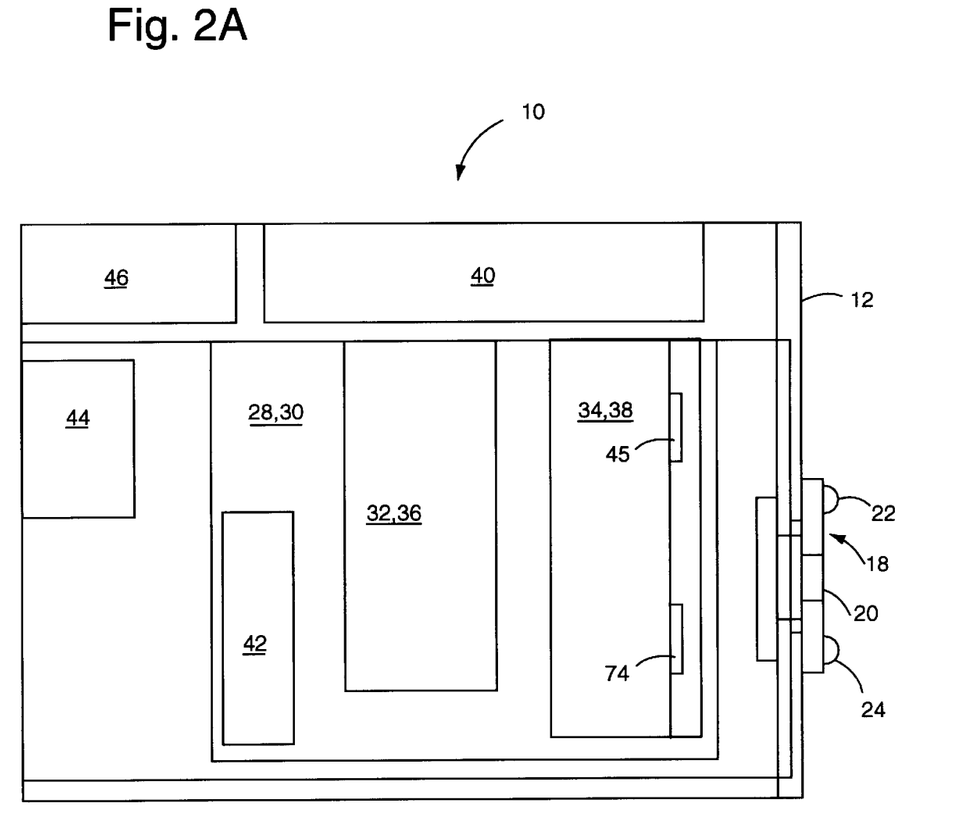
FIGS. 2A–2C are top, side and front end views, respectively, of the light source of FIG. 1.
Figure 2B:
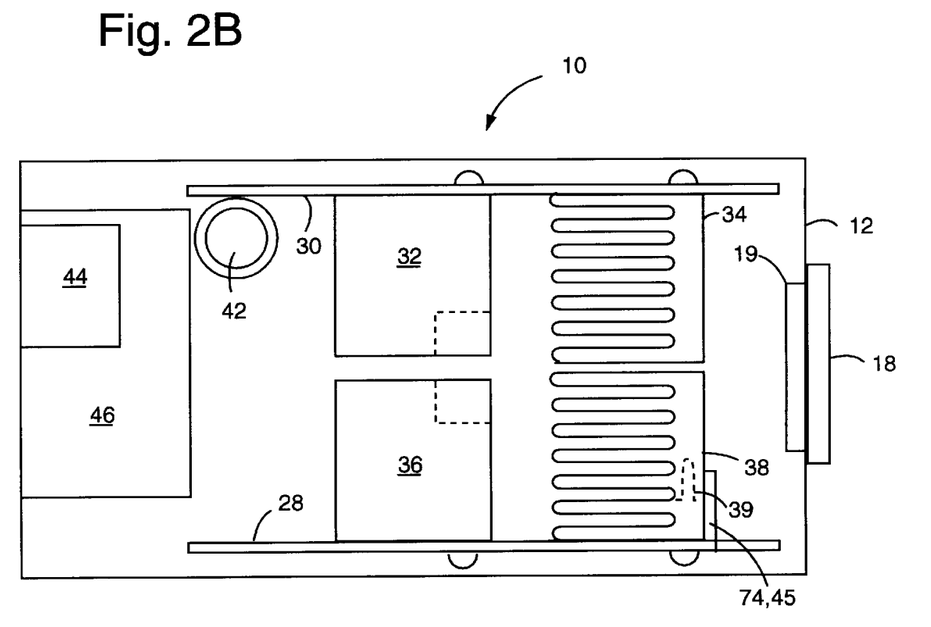
Figure 2C:
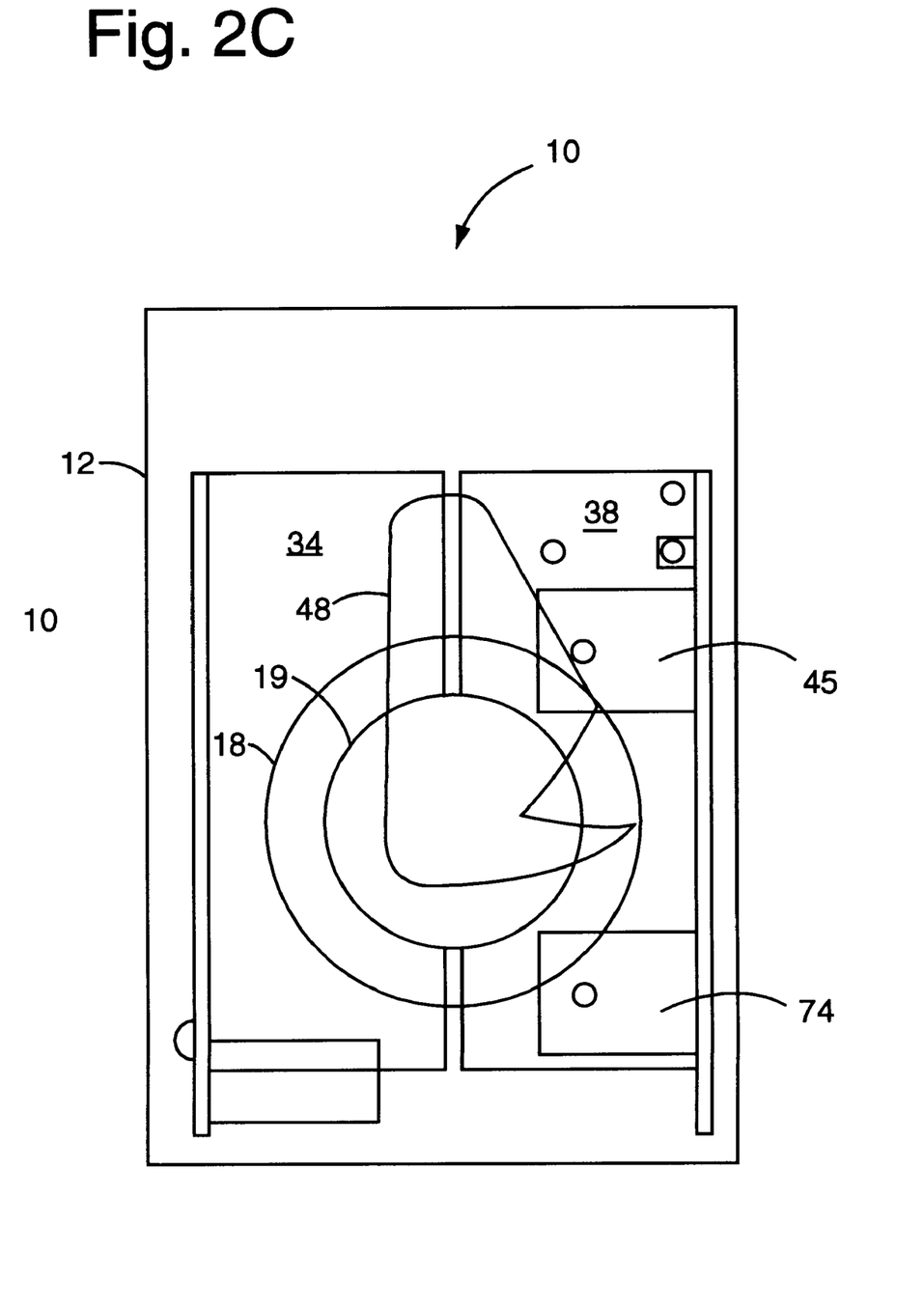

In FIGS. 2A–2C, the light source 10 is shown to comprise inside the housing 12 a main printed circuit board (PCB) 28 and an upper mezzanine PCB 30. An upper anode heatsink 32 and an upper cathode heatsink 34 are each attached to the bottom of the upper mezzanine PCB 30. Similarly, a bottom anode heatsink 36 and a bottom cathode heatsink 38 are each attached to the top of the main PCB 28. A hemispherical ridge 39 is provided in the front edge of the bottom cathode heatsink 38 to preferentially steer the heat coupling into the upper cathode heatsink 34 and to help retain the lamp in its position.

The heatsinks 32, 34, 36, and 38 have a system of parallel fins that cooperatively channel through an airflow that horizontally transverses through the housing 12 beginning at the air intake hole 14. Alternatively, the rear bottom heatsink 36 may be a narrower solid block of aluminum at the bottom to allow more component mounting space on the PCB 28 and finned above. A fan 40 forces an airflow through and is operated on direct current (DC). An ignitor coil 42 is mounted on the underside of the upper mezzanine PCB 30. An interlock switch 44 is a user safety device that interrupts power inside the housing 12 during access. A thermal switch 45 is thermally connected to the lower cathode heatsink 38 to act as a safety device to prevent overheating should the cooling fan fail. It operates to interrupt the main power input. A power entry module 46 provides a receptacle for a power cord, operating voltage selection, and electromagnetic interference (EMI) filtering. A shutter 48 allows for light to be interrupted to the fiberoptic cable output at the central hole 20 in the adapter plate 18.

Figure 3:
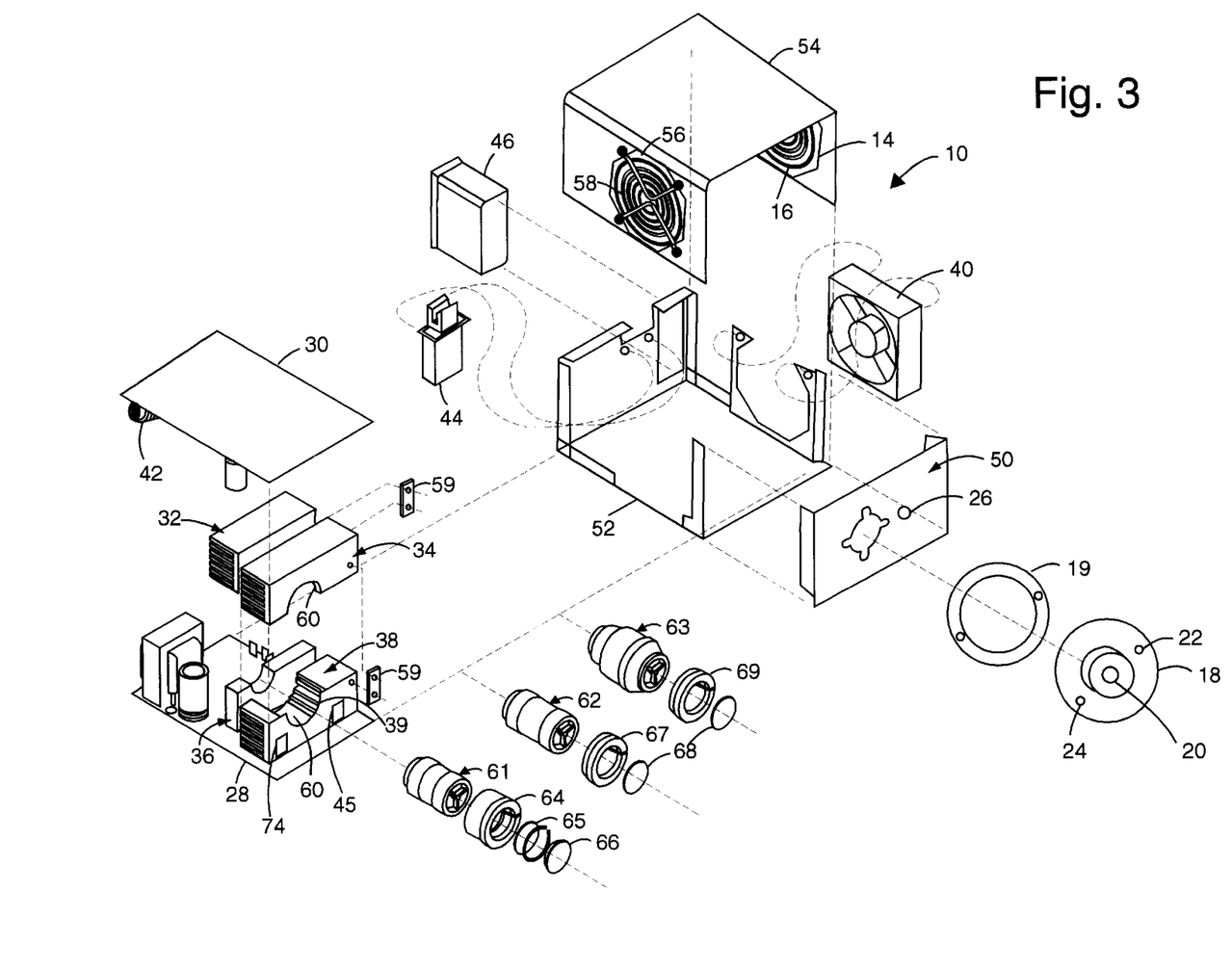
FIG. 3 is an exploded assembly diagram of most of the components that comprise the light source of FIG. 1.

In FIG. 3, the housing 12 for the light source 10 is shown to preferably comprise an assembly which includes a front plate 50, a chassis base 52 and a top cover 54. An airflow exhaust hole 56 and a grille 58 are provided in the top cover 54. The heatsinks 32, 34, 36, and 38 are shown in FIG. 3 with a couple of double axis hinges 59 that attach on the fan 40 side between heatsinks 32 and 36 and between heatsinks 34 and 38. A lamp relief 60 is provided in each of the cathode heatsinks 34 and 38 to accommodate a variety of lamps, for example, an ILC Technology "LX" series 61, an "EX" series 62, and a "1.4 inch" type 63. Although the present invention is not limited to a particular maximum power, 300 watts can be delivered in one embodiment from the power supply on the lower PCB 28 to the lamp, and variable-resistor adjustments allow 125–300 watts to be actually delivered according to the type of lamp 61–63 installed other embodiments may operate at higher or lower power levels.

The lamp 61 is connected to a cooling ring 64 that helps the lamp to dissipate its heat and that houses a hot mirror 65 and a lens 66. An alternative cooling ring 67 is shown associated with the "EX" series lamp 62 and it too houses a hot mirror 68 that can be shared with a cooling ring 69. Preferably, the hot mirrors 65 and 68 are fused silica glass with conventional coatings that selectively reflect infrared light. The planes of the hot mirrors 65 and 68 are tilted from the perpendicular to the lamp's optical axis to reflect infrared light back toward the lamp but off-axis five to ten degrees, depending on the lamp type. Such tilting improves lamp life because the heat is returned to other than the arc electrodes and this helps to keep the temperatures down to reasonable levels.

The heatsinks 32, 34, 36, and 38 are preferably matched in size to the fan 40, e.g., a 3.13 inch square fan. The heatsinks 32, 34, 36, and 38 must securely grab the front and back of the lamp 61–63. Any fins used on the heatsinks 32, 34, 36, and 38 generally have an aspect ratio due to limitations of current commercial fabricators in extruding such shapes. The heatsinks 32, 34, 36, and 38 must fill the whole of the outlet area of the fan 40, so the front of the lamp 61–63 needs to have something to "take up" the excess space. For example, the cooling ring 64, 67, or 69 can be used. Such cooling ring can also be used to hold the infrared-eliminating hot mirror 65 or 68. When the heatsinks 32, 34, 36, and 38 and excess space are properly configured, the light source 10 can typically be operated at over 300 watts without exceeding the temperature ratings for typical lamps 61–63.

A configured single-axis hinge arrangement on the prior art LOAS design wasted some of the airspace volume available for cooling by notching the heatsinks to clear the fan when they were swung up. This allowed precious airflow to be wasted that was not put to work in cooling the heatsinks and the lamps. In preferred embodiments of the light source 10, the double-axis hinges 59 are included that allow the upper heatsinks 32 and 34 to open like a jaw and then swing up on one axis and pivot around on a second axis to allow the lamp 61–63 to be extracted, all without interference with the fan 40. This double axis hinge 59 allows the heatsinks to be designed to use all the volume available without having to make sacrifices in material just to allow hinge-swing clearances.

The air stream in the light source 10 is confined into a channel in part by the upper mezzanine PCB 30. The igniter and a boost circuit are more advantageously placed on a separate upper PC board. A DC fan drive circuit to power the fan 40 is also preferably included in the upper mezzanine PCB 30. A twelve VDC voltage for the fan is typically derived from the lamp supply voltage. Connecting the fan 40 to such points on the upper PC board 30 eliminates any need for fan connections to the lower PC board 28. The upper PC board 30 preferably holds the two upper heatsinks 32 and 34 firmly and squarely against the lamp 61–63. The upper PC board 30 therefore makes a solid electrical contact with the cathode and anode of the lamp 61–63, and the only other electrical connection needed to the upper PC board 30 is made with a loop of flex wire that allows the upper PC board 30 to be swung up out of the way for lamp replacement. This flex wire connection also provides a convenient place to interrupt and measure the lamp current to do the initial power supply adjustments.

In embodiments that have specialized applications, the light source 10 is a fiberoptic illuminator that preferably mounts cooling rings 64, 67, and 69 on the front of the lamps 61–63 and provides a set of large internal cutouts inside the cathode heatsinks 34 and 38 to accommodate both parabolic and elliptical CERMAX-type lamps, e.g., as large as 500 watts. The cooling ring 64 used with parabolic-type CERMAX-type lamps 61 will typically be longer than the cooling rings 67 and 69 for elliptical lamps 62 and 63 because it includes both the hot mirror 65 and the lens 66. Hot mirrors 65 and 68 are angled or titled off-axis within their respective cooling rings 64, 67, and 69 at an angle that is greater than five degrees. The reflected infrared radiation is therefore not returned directly to the cathode and the lamps 61–63 run cooler and can live longer. The cooling rings 67 and 69 used with elliptical-type CERMAX-type lamps 62 and 63 preferably have the hot mirrors 65 and 68 set at an angle that is approximately ten degrees off-axis. Alternatively, the lens 66 inside the cooling ring 64, which presents a convex surface to the lamp 61, can be coated to reflect infrared light from the lamp back out in an expanding cone pattern. That, in effect, will diffuse the infrared reflection away from the central axis of the lamp.

In order to accommodate such cooling rings 64, 67, and 69, provision is made to keep the lamp 61–63 from slipping forward in the heatsinks 32, 34, 36, and 38. A groove is added to the cooling rings 64, 67, and 69 that mates with the corresponding ridge 39 in the lower cathode heatsink 38. This "heat chokes" the heat flow from the lamp 61–63 to the lower cathode heatsink 38 and allows any high power transistors that need heatsinking to be attached to the lower cathode heatsink 38.

The cathode heatsink 38 is sized to be large enough to accommodate such power transistors and a thermal protection switch that shuts off the lamps 61–63 if a failure of fan 40 occurs.

There is a premium on PC board space in the light source 10 because a critical design goal is to use the smallest overall volume possible. Toward this end, an alternative embodiment of the light source 10 cuts away parts of the fins of the lower anode heatsink 36 to accommodate electronic components on the lower PCB 28. This is possible because the anode heatsinks 32 and 36 typically run cool enough to allow some sacrificing of the heatsink mass.

In general, safe, long-life operation of the whole system requires that the operating temperatures of the ceramic parts of the lamps 61–63 must not exceed 150° C.–160° C. The metal parts and the window of the lamp 61–63 are not so difficult to control because they are conductively cooled directly by the heatsinks 32, 34, 36, and 38. The patch of ceramic material between the anode and cathode on the top center of the lamp can reach 160° C. at the same time the lamp base and window are only 100° C. The lamp power is thus limited by the ceramic temperature.

In alternative embodiments of the present invention, a thin heat-conductive band is therefore preferably placed around the center ceramic to spread the heat and reduce hot spotting. Such a conductive band is used to reduce temperature gradients between the top and bottom of the ceramic center of the lamp. Small cooling fins are also preferably placed on the conductive band to carry some of the heat from the ceramic to the air stream.

Safety codes provide that users should not be able to gain access to any live electrical components without having to use a tool. Without such a requirement, it would be typical to design a fiberoptic adapter that attached with screws that passed through the front panel 50 to an otherwise floating backing plate. However, if such user wanted to change to a different type of fiberoptic adapter 18, the user would need to gain access inside to realign the fiberoptic adapter 18 to the lamp 61–63. In the embodiments of the present invention, the backing plate is independently aligned and secured to the front panel 50. The fiberoptic adapter 18 is attached to the backing plate with screws 22 and 24 without affecting the alignment of the backing plate to the lamp 61–63.

Figure 4:
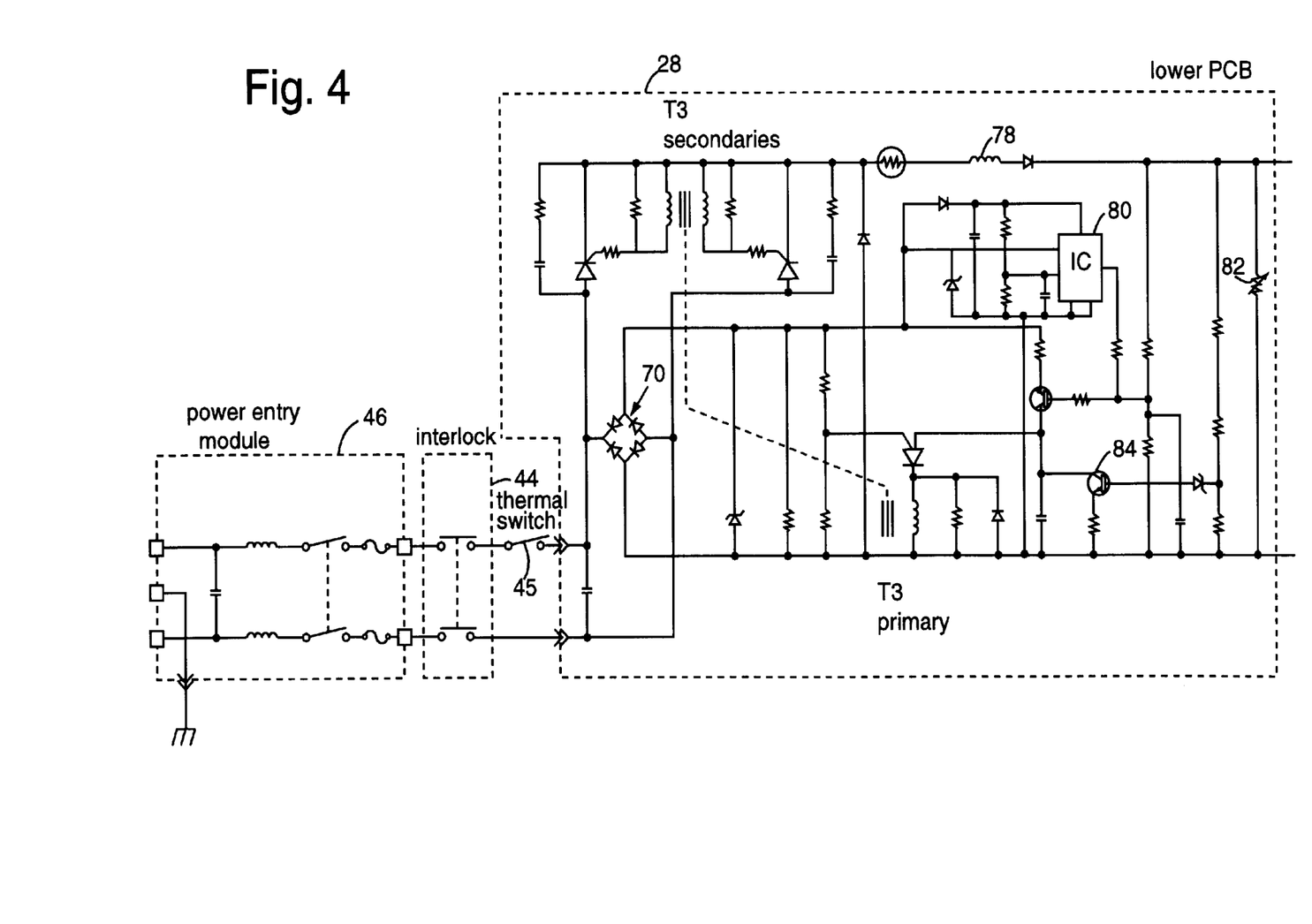
FIG. 4 is a schematic diagram of the power entry module, the interlock switch, and a part of the lower main printed circuit board included in the light source of FIG. 1.
Figure 5:
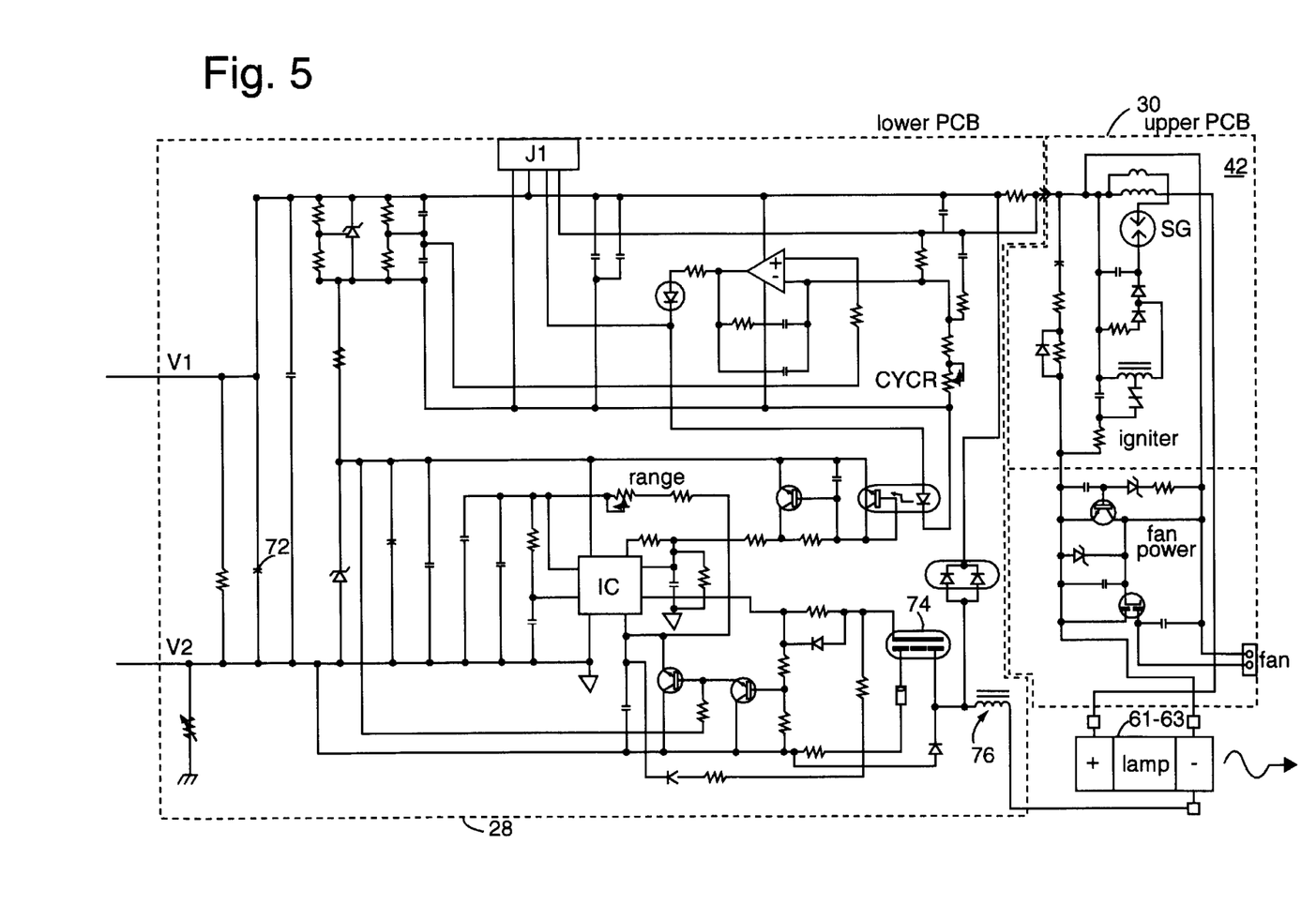
FIG. 5 is a schematic diagram of a part of the lower main printed circuit board and the whole of the upper mezzanine printed circuit board and lamp included in the light source of FIG. 1.

FIGS. 4 and 5 are schematics of the lower and upper PCB's 28 and 30. An important ability of the switching power supply shown in FIG. 4 is being able to operate from 220 VAC. The basic switcher power supply shown as part of PCB 28 is a very efficient design and uses a relatively small number of parts.

For example, when operating at a line voltage of 110 VAC, a bridge rectifier 70 produces a rectified line voltage on a capacitor 72 (FIG. 5) of about 160 VDC. A field effect transistor (FET) 74 and an inductor 76 switch and filter such rectified line voltage down to the 12–15 VDC needed to operate the lamps 61–63.

When operating a line voltage of 220 VAC, there would ordinarily appear 320 VDC on capacitor 72. The FET 74 would have to operate with an exceedingly small duty cycle to make the large step between 320 VDC and twelve to fifteen VDC. Such exceedingly small duty cycles would make it very difficult to control the output voltage.

So a pre-regulator is effectively placed between the bridge rectifier 70 and the FET 74. Any 220 VAC line voltage is pre-regulated down to about 160 VDC on capacitor 72. Ordinarily, the use of such a circuit to solve the 220 VAC input problem would be conventional. But additional circuit elements are needed to keep the circuit stable both during startup and during operation over a wide range of input conditions.

In order to solve these problems, the lower main PCB 28 includes an inductor 78, an integrated circuit (IC) 80, a varistor 82, and a NPN-transistor 84 in an unusual circuit configuration.

A principle advantage of the circuit shown in FIGS. 4 and 5 is that the parts count is lower than it would be with a more conventional 110/220 VAC lamp power supply, even with the added parts of the pre-regulator. Another advantage of this approach is that in those cases where the light source 10 does not need to operate at 220 VAC, the pre-regulator components can be deleted from the lower PCB 28 to save the component cost.

In FIG. 5, the main filter choke 76 is very often the largest and most expensive electronic component in the light source 10. The current capacity of the main filter choke 76 largely determines the power capability of the light source 10. In prior art designs, the main filter choke is a 210 microhenry inductor rated at fifteen amps. This limited the lamp operation to about 185 watts. In the present invention, the value of the main filter choke 76 can be fixed at about eighty-five microhenries with a current rating of twenty-five amps and still keep the overall size about the same. Such decreasing of the inductance of the main filter choke 76 will increase the current ripple through the lamp 61–63, and artisans have regarded this as adverse to long lamp life. Various lamp manufacturers typically recommend that the power drive include no more than ten percent current ripple, otherwise lamp life will be shortened.

The main filter choke 76 size suggested herein has the effect of increasing only the high frequency components of the ripple to more than ten percent of the total. The low frequency ripple component is not increased because active components in the power supply regulator remove some of the 60 Hz and 120 Hz ripple. Therefore the lamp life of CERMAX-type-type arc lamps does not appear to be adversely affected by high frequency ripple that exceeds ten percent of the total lamp power.

An important use of embodiments of the present invention is in video projector systems. In such cases, just the basic lamp, cooling, and power circuitry described here would be included in the otherwise conventional video projector.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A light source, comprising:

a high intensity lamp with a pair of opposite anode and cathode ends;

a plurality of finned heatsinks with the high intensity lamp held by and between them;

a lower main printed circuit board (PCB) on which are mounted a lower pair of the finned heatsinks and which respectively connect thermally and electrically to said anode and cathode ends of the lamp; and a powered fan positioned on one side of the finned heatsinks to blow air through a matrix of the plurality of finned heatsinks.

2. The light source of claim 1, further comprising:

an upper mezzanine printed circuit board (PCB) on which are mounted an upper pair of the finned heatsinks which respectively connect both electrically and thermally to said anode and cathode ends of the lamp.

3. The light source of claim 2, wherein:

the upper mezzanine printed circuit board includes a fan power circuit that derives a fan voltage from a lamp voltage supplied to the high intensity lamp to eliminate a needed connection to a lower main printed circuit board.

4. The light source of claim 2, wherein:

the upper mezzanine printed circuit board holds two upper heatsinks in a matrix of four half-shell finned heatsinks firmly and squarely in thermal and isolated electrical contact against the high intensity lamp such that only one additional electrical connection is needed between the upper mezzanine printed circuit board and a lower main printed circuit board, and said one additional electrical connection comprises a wire that flexes when the upper mezzanine printed circuit board is swung out of the way for replacement of the high intensity lamp and that provides a convenient lamp-current measurement shunt during initial power supply adjustments.

5. The light source of claim 1, further comprising:

a lamp igniter and a fan that each receives lamp power from a lower main printed circuit board through an anode pair and a cathode pair of the matrix of heatsinks.

6. The light source of claim 1, further comprising:

a main power supply included on the lower PCB that converts and preregulates 110 VAC or 220 VAC to a transistor chopping switch that in turn provides a low voltage lamp power;

wherein a wide variety of input line voltages may be accommodated.

7. The light source of claim 1, further comprising:

a cooling ring mounted to a front face of the high intensity lamp in order to improve lamp life.

8. The light source of claim 1, further comprising:

a tilted hot mirror that reflects infrared light back to the lamp such that said infrared light after being reflected is substantially off-axis in order to improve lamp life.

9. The light source of claim 8, wherein:

at least one of the matrix of said finned heatsinks includes a groove that mates with a cooling ring to retain the high intensity lamp and steer heat flow in a preferred direction.

10. The light source of claim 1, further comprising:

a housing in which all the other components are enclosed and that assists the fan in cooling the high intensity lamp by directing airflow through said matrix of four half-shell finned heatsinks.

11. The light source of claim 1, wherein:

said matrix of heatsinks and a lower main printed circuit board form a box channel that constricts said air blown by the fan.

12. The light source of claim 1, further comprising:

a fiberoptic cable adapter and backing ring mounted and optically aligned in front of a high intensity lamp such that a fiberoptic cable adapter can be changed from an outside access without affecting an optical pre-alignment of said lamp to a fiberoptic cable.

* * * * *